US009339961B2

(12) United States Patent
Maruyama et al.

(10) Patent No.: US 9,339,961 B2
(45) Date of Patent: May 17, 2016

(54) METERING CONTROLLER FOR INJECTION MOLDING MACHINE

(75) Inventors: Junpei Maruyama, Yamanashi (JP); Tatsuhiro Uchiyama, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 880 days.

(21) Appl. No.: 13/549,431

(22) Filed: Jul. 14, 2012

(65) Prior Publication Data

US 2013/0095199 A1    Apr. 18, 2013

(30) Foreign Application Priority Data

Oct. 14, 2011    (JP) .................................. 2011-226671

(51) Int. Cl.
*B29C 45/50*    (2006.01)
(52) U.S. Cl.
CPC ......... *B29C 45/50* (2013.01); *B29C 2045/5096* (2013.01); *B29C 2945/76852* (2013.01)
(58) Field of Classification Search
CPC ........................................................ B29C 45/50
See application file for complete search history.

(56) References Cited

U.S. PATENT DOCUMENTS

| 5,002,717 | A | * | 3/1991 | Taniguchi | ............... | B29C 45/50 |
| | | | | | | 264/328.1 |
| 5,756,037 | A | | 5/1998 | Kitamura | | |
| 7,654,809 | B2 | * | 2/2010 | Takatsugi | ............... | B29C 45/52 |
| | | | | | | 425/145 |
| 2004/0096534 | A1 | | 5/2004 | Shiraishi et al. | | |
| 2006/0278014 | A1 | | 12/2006 | Okada et al. | | |
| 2007/0196530 | A1 | | 8/2007 | Shiraishi et al. | | |
| 2008/0150181 | A1 | | 6/2008 | Maruyama et al. | | |
| 2009/0026646 | A1 | | 1/2009 | Maruyama et al. | | |

FOREIGN PATENT DOCUMENTS

| CN | 1498742 A | 5/2004 |
| CN | 101209579 A | 7/2008 |
| JP | 6076321 A | 3/1994 |

(Continued)

OTHER PUBLICATIONS

Office Action dated Jan. 4, 2015, corresponding to Chinese patent Application No. 201210387892.6.

(Continued)

*Primary Examiner* — Ryan Ochylski
(74) *Attorney, Agent, or Firm* — Hauptman Ham, LLP

(57) ABSTRACT

During metering, a screw is retreated to a preset metering completion position while it is being forwardly rotated. Pilot injection is performed such that the screw is reversely rotated and advanced so that a resin pressure reaches a predetermined compression pressure, during a time period between the end of the metering and the start of injection. The screw reverse rotation is continued before the screw advance is started for the pilot injection. In this way, a check valve can be closed at a relatively low pressure such that precision metering can be achieved.

7 Claims, 6 Drawing Sheets

(56) References Cited

FOREIGN PATENT DOCUMENTS

| | | |
|---|---|---|
| JP | 929794 A | 2/1997 |
| JP | 1016015 A | 1/1998 |
| JP | 11-240052 A | 9/1999 |
| JP | 200179906 A | 3/2001 |
| JP | 2006-110759 A | 4/2006 |
| JP | 2006327127 A | 12/2006 |
| JP | 2007-253388 A | 10/2007 |
| JP | 2007253606 A | 10/2007 |
| JP | 2009-40027 A | 2/2009 |
| JP | 2009-255438 A | 11/2009 |

OTHER PUBLICATIONS

Notification of Reasons for Refusal issued in JP Patent Application No. 2011-226671 dated Dec. 4, 2012, 4 pages. (w/English translation).

Office Action issued Mar. 4, 2015, corresponding to German patent application No. 102012019499.4.

* cited by examiner

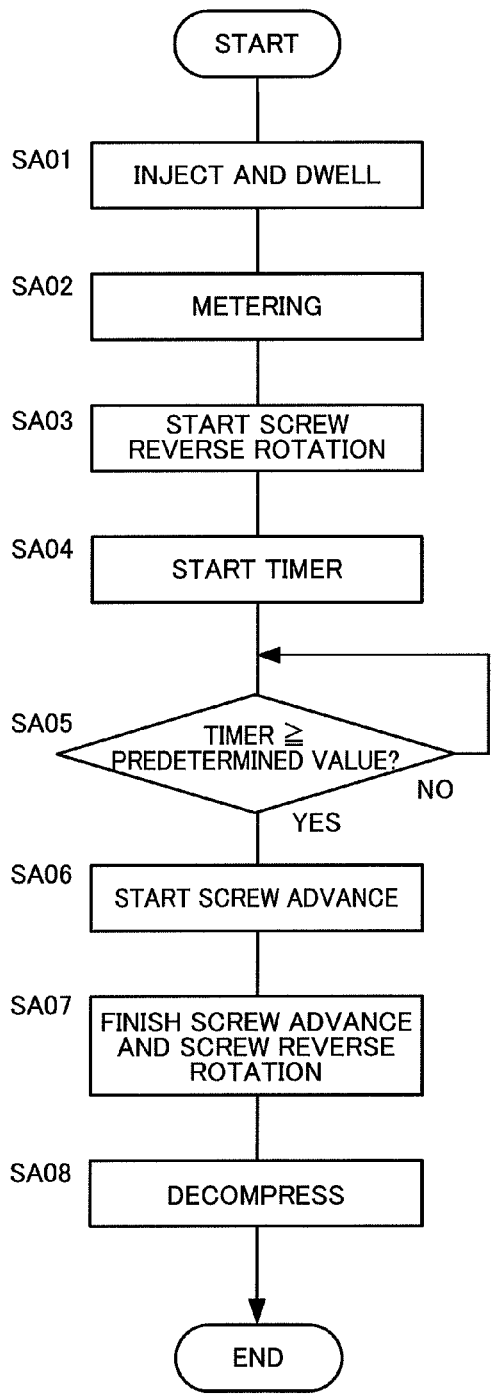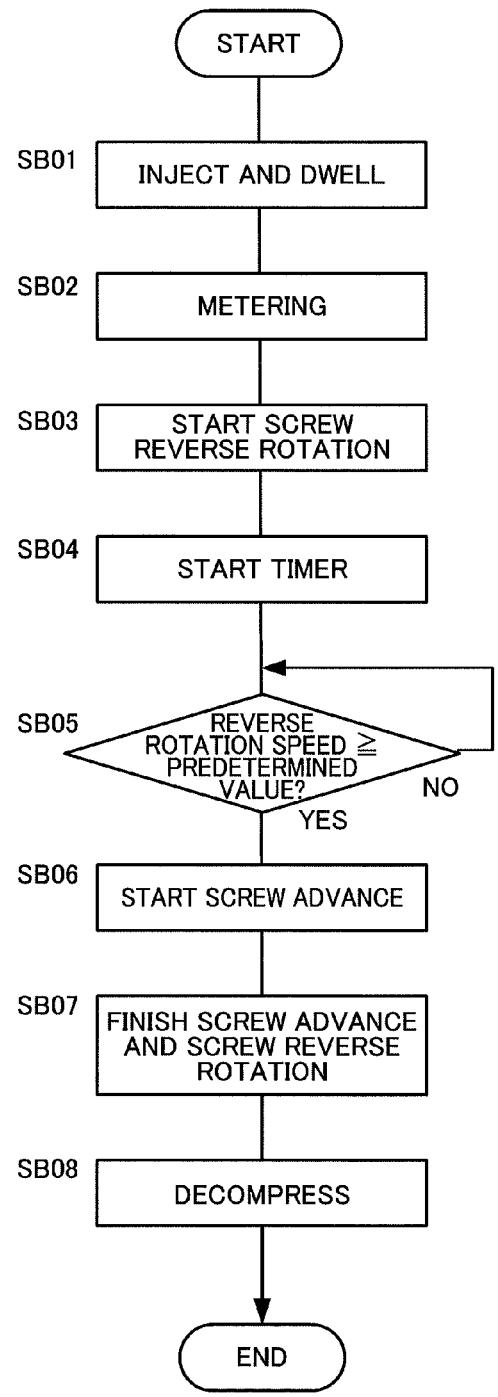

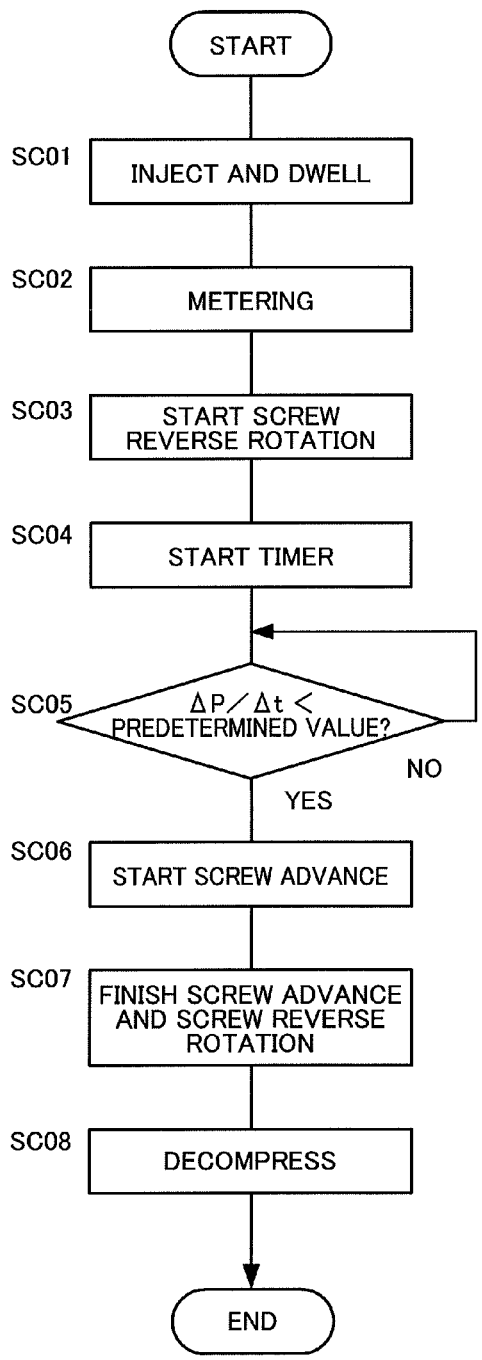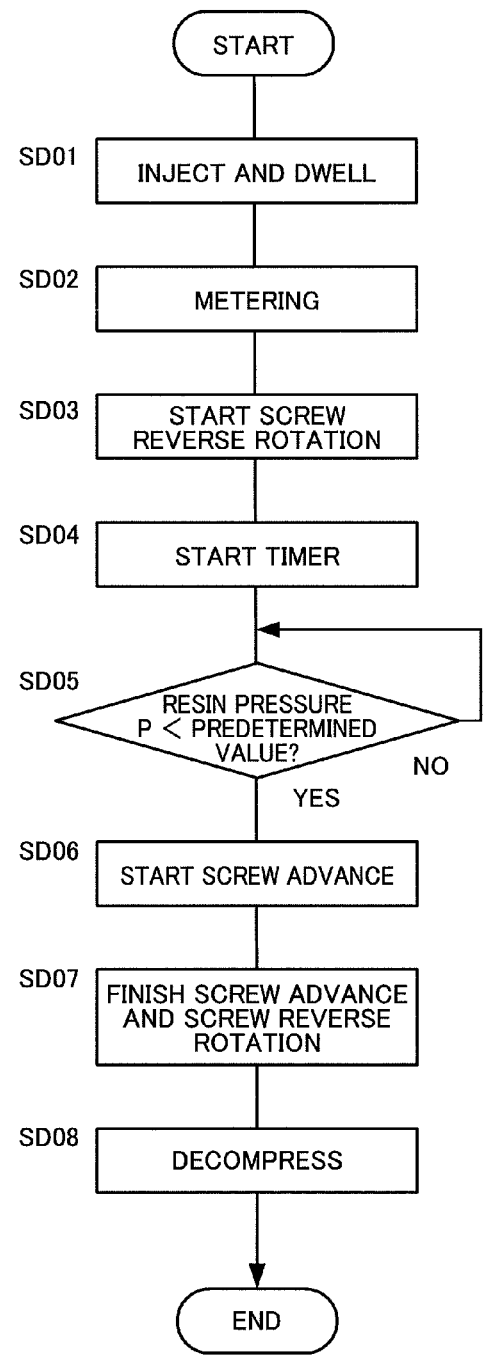

METERING CONTROLLER FOR INJECTION MOLDING MACHINE

RELATED APPLICATIONS

The present application is based on, and claims priority from, Japanese Application Number 2011-226671, filed Oct. 14, 2011, the disclosure of which is hereby incorporated by reference herein in its entirety.

BACKGROUND OF THE INVENTION

1. Field of the Invention

The present invention relates to a controller for an injection molding machine capable of achieving precision metering of resin.

2. Description of the Related Art

In an in-line screw injection molding machine, a screw in a heating cylinder is rotated to melt and knead a resin material, and the molten resin is fed to the tip portion of the heating cylinder under pressure. Then, the screw is retreated under pressure control. When the screw reaches a set metering point, its rotation and retreat are stopped, and metering of the resin is performed. After this metering, the screw is advanced to inject and fill the molten resin into a mold.

Dispersion of the fill of the molten resin in the mold should be reduced in order to improve the quality of molded products. The molten resin is injected after the screw is retreated to the position of the metering point. If the metered molten resin is directly injected and filled into the mold when this is done, an accurate fill can be obtained, so that the molded products are not subject to dispersion in weight and their quality can be kept uniform. There is a problem, however, that the molten resin flows backward to change the amount of injected resin as an injection process is started on completion of the metering process, so that an accurate amount of molten resin cannot be injected.

A valve, such as a check valve or check ring, is attached to the tip of the screw, whereby the molten resin produced by the rotation of the screw can be fed to the tip portion of the cylinder in a metering process, and the molten resin at the tip portion of the screw can be injected into the mold by virtue of not flowing backward in the injection process. This valve prevents the molten resin from flowing backward and changing the metered resin amount during the time period between the completion of metering and the start of injection. Thus, the metered amount of resin can be injected accurately. However, there is a problem that the molten resin may be caused to flow backward by delayed operation of backflow preventing means, such as a valve for preventing backflow of the molten resin, so that an accurate amount of molten resin cannot be injected. Various techniques have been proposed to improve this problem.

According to a technique disclosed in Japanese Patent Application Laid-Open No. 60-76321, for example, after a molten resin is plasticized and metered, pilot injection is performed such that a pressure lower than the pressure of injection of the molten resin into the cavity of the pressure chamber of an injection cylinder is maintained for a fixed period of time or so that it increases to a fixed level. During the pilot injection, moreover, a screw is rotated in the direction opposite to the rotation for the plasticization and metering. Thus, a pressure difference is produced between the front and rear sides of a check valve to retreat the valve.

According to a technique based on a post-metering process disclosed in Japanese Patent Application Laid-Open No. 2006-327127, a screw is allowed to freely rotate as it is advanced after a main metering process is finished, and the rotating state of the screw during the advance is monitored. When the screw is stopped from rotating, in this case, it is reversely rotated by a predetermined amount.

According to a technique disclosed in Japanese Patent Application Laid-Open No. 2007-253388, a screw is stopped from rotating when a set metering completion position is reached, and an injection servomotor is driven to advance the screw. By doing this, a pressure P2 higher than a back-pressure P1 is applied to close a check valve. Thereafter, a servomotor for screw rotation is driven to reversely rotate the screw by a fixed amount under the pressure P2, and a pressure p1 of a molten resin in a cylinder is reduced to zero or p2 as close to zero as possible.

According to a technique disclosed in Japanese Patent Application Laid-Open No. 2007-253606, a screw or plunger having undergone metering is advanced forward at a predetermined speed in an injection direction for a predetermined time or so that a predetermined pressure or position is reached, after a retreat process in which the screw is retreated in the direction opposite to the injection direction. Thereafter, the screw is rotated at a predetermined speed in the direction opposite to that in a metering process.

In any of the prior art techniques described above, the screw is advanced to increase the resin pressure in order to close the check valve after the end of metering, and is reversely rotated at the same time or thereafter. In this case, the resin pressure is increased to a somewhat high level during the screw advance, whereby a pressure difference is produced such that the pressure (resin pressure) of the check valve on the screw-tip side is higher than the pressure on the screw-root side. This pressure difference produces a force to move the check valve from the tip side of the screw to the root side, thereby closing the check valve. In order to close the check valve reliably and steadily during the screw advance, therefore, the resin pressure should be increased to a certain level or higher (see FIG. 8). Depending on the type of the mold or molded products, however, application of a high pressure after the end of metering may cause problems on molding. The foregoing prior art techniques cannot be used in such a case.

SUMMARY OF THE INVENTION

Accordingly, the object of the present invention is to provide a metering controller for an injection molding machine, configured so that a check valve can be closed at a relatively low pressure such that precision metering can be achieved.

A metering controller for an injection molding machine according to the present invention comprises a screw advancing/retreating unit for advancing and retreating a screw, a screw rotating unit for rotating the screw, a resin pressure detection unit configured to detect a resin pressure, a metering unit configured to retreat the screw to a preset metering completion position while forwardly rotating the screw during metering, a screw reverse rotation unit configured to reversely rotate the screw during a time period between the end of the metering and the start of injection, and a pilot injection unit configured to advance the screw so that the resin pressure reaches a predetermined compression pressure during the time period between the end of the metering and the start of the injection. The pilot injection unit starts screw advance after the start of the screw reverse rotation by the screw reverse rotation unit, and the screw reverse rotation unit continues the screw reverse rotation at least before the screw advance is started by the pilot injection unit.

The pilot injection unit may start the screw advance after the elapse of a predetermined time since the start of the screw reverse rotation by the screw reverse rotation unit.

The pilot injection unit may start the screw advance when a predetermined speed is reached by the speed of the screw reverse rotation after the start of the screw reverse rotation by the screw reverse rotation unit.

The pilot injection unit may start the screw advance when a predetermined value is reached by a resin pressure variation per unit time after the start of the screw reverse rotation by the screw reverse rotation unit.

The pilot injection unit may start the screw advance when the resin pressure is reduced to a predetermined pressure after the start of the screw reverse rotation by the screw reverse rotation unit.

According to the present invention, a check valve can be closed steadily and reliably without applying a high resin pressure as a screw is advanced after metering. According to the invention, moreover, problems on molding due to the application of a high resin pressure after metering can be avoided, and closing control of the check valve is available for various molds.

BRIEF DESCRIPTION OF THE DRAWINGS

The above and other objects and features of the present invention will be obvious from the ensuing description of embodiments with reference to the accompanying drawings, in which:

FIG. 4 is a flowchart illustrating an algorithm of processing performed by the metering controller of the present invention in which the screw advance is started after the elapse of a predetermined time since the start of screw reverse rotation;

FIG. 5 is a flowchart illustrating an algorithm of processing performed by the metering controller of the present invention in which the screw advance is started when a predetermined speed is reached by the screw reverse rotation speed after the start of the screw reverse rotation;

FIG. 6 is a flowchart illustrating an algorithm of processing performed by the metering controller of the present invention in which the screw advance is started when the predetermined value is reached by the resin pressure variation per unit time after the start of the screw reverse rotation;

FIG. 7 is a flowchart illustrating an algorithm of processing performed by the metering controller of the present invention in which the screw advance is started when the resin pressure is reduced to the predetermined pressure after the start of the screw reverse rotation.

DETAILED DESCRIPTION OF THE PREFERRED EMBODIMENTS

Figure 1:
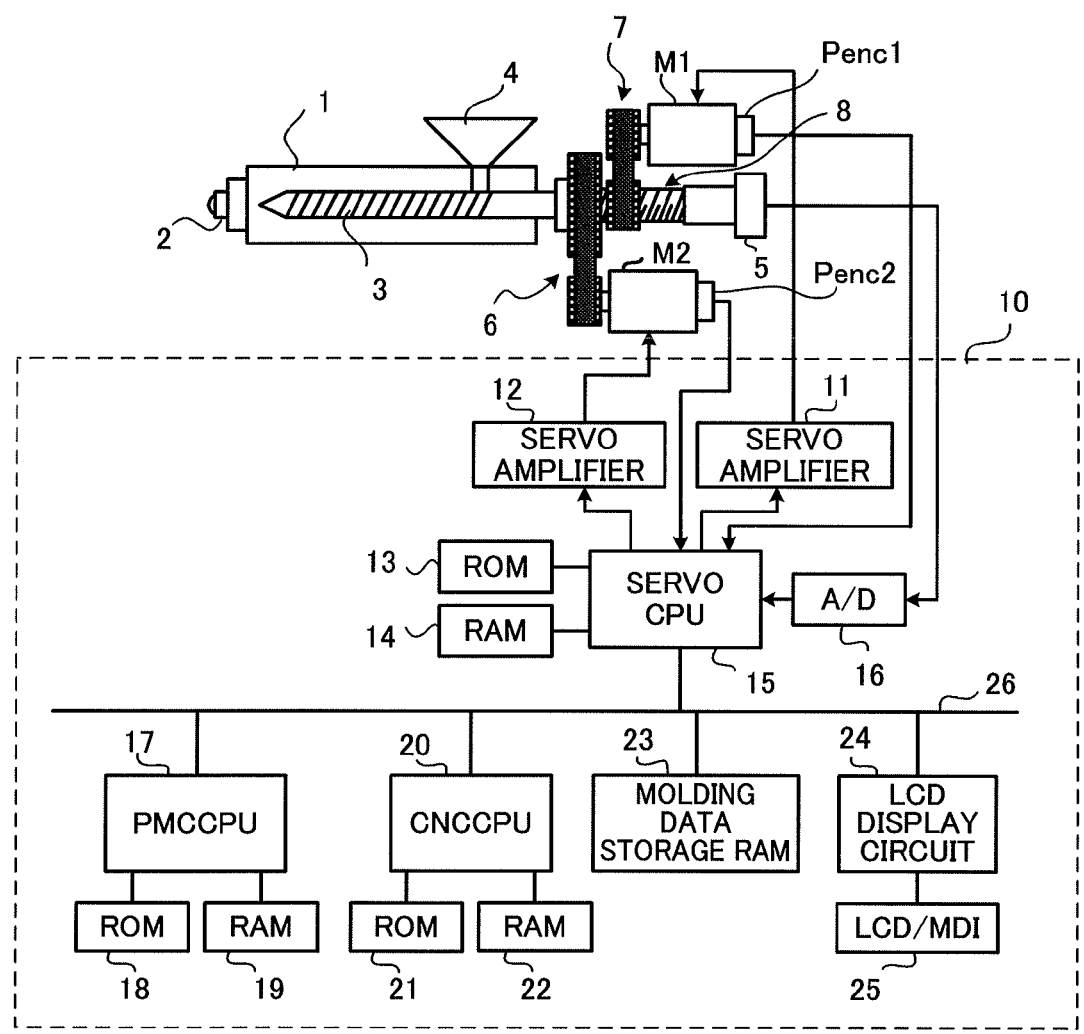
FIG. 1 is a diagram illustrating a controller for an injection molding machine capable of functioning as a metering controller according to the present invention.

One embodiment of a controller of an injection molding machine, which functions as a metering controller according to the present invention, will be described with reference to FIG. 1.

The metering controller according to the present invention is a function of a controller 10 for controlling the injection molding machine. A nozzle 2 is attached to the tip of a cylinder 1 into which a screw 3 is inserted. A hopper 4 for supplying resin pellets to the cylinder 1 is attached to the rear end portion of the cylinder 1. The screw 3 is configured so that it is axially driven by a conversion mechanism 8, which converts rotary motions of an injection servomotor M1, power train 7, ball screw/nut, etc., into linear motions, and is subjected to injection and back-pressure control. Further, the screw 3 is rotated by a screw-rotation servomotor M2 and a power train 6, which comprises a belt, pulleys, etc.

Position/speed detectors Penc1 and Penc2 for detecting rotational positions and speeds are attached to the injection servomotor M1 and the screw-rotation servomotor M2, respectively. The position (axial position) of the screw 3, moving speed (injection speed), and rotational speed of the screw 3 can be detected by the position/speed detectors Penc1 and Penc2. Further, a pressure sensor 5, such as a load cell, is provided for detecting a pressure (resin pressure P) from a molten resin that acts on the screw 3 in the direction of the screw axis.

A PMC-CPU 17 is connected with a ROM 18 stored with sequential programs for controlling the sequential operation of the injection molding machine and a RAM 19 used for temporary storage of arithmetic data and the like. A CNC-CPU 20 is connected with a ROM 21 stored with automatic operation programs for generally controlling the injection molding machine and a RAM 22 used for temporary storage of arithmetic data and the like. A servo CPU 15 is connected with a ROM 13 loaded with a dedicated servo control program for position, speed, and current loop processing and a RAM 14 used for temporary storage of data. Further, the servo CPU 15 is connected with a servo amplifier 12, configured to drive the screw-rotation servomotor M2 based on a command from the servo CPU 15, and a servo amplifier 11 configured to drive the injection servomotor M1.

As mentioned before, the position/speed detectors Penc1 and Penc2 are attached to the servomotors M1 and M2, respectively. Outputs from the position/speed detectors Penc1 and Penc2 are fed back to the servo CPU 15. The servo CPU 15 performs position and speed feedback control, based on move commands for axes (of the injection servomotor M1 or screw-rotation servomotor M2) issued from the CNC-CPU 20, and also performs current feedback control, thereby drivingly controlling the servo amplifiers 11 and 12. Further, a present position register is provided for determining an advanced position (axial position) of the screw 3 by a position feedback signal from the position/speed detector Penc1 such that the screw position can be detected by the present position register.

Furthermore, the resin pressure (applied to the screw), obtained by converting a detection signal from the pressure sensor 5 into a digital signal by an A/D converter 16, is input to the servo CPU 15. An input device 25 with a display unit, formed of a liquid-crystal display or the like, is connected to a bus 26 through a display circuit 24. Further, a RAM 23 for molding data storage, formed of a nonvolatile memory, is also connected to the bus 26. The data storage RAM 23 stores molding conditions and various settings, parameters, macro variables, etc., for injection molding operation.

With this arrangement, the PMC-CPU 17 controls the sequential operation of the entire injection molding machine, and the CNC-CPU 20 distributes move commands to the servomotors M1 and M2 for the individual axes, based on the operation programs in the ROM 21, the molding conditions in the molding data storage RAM 23, etc. The servo CPU 15, like a conventional one, performs servo control, that is, position loop control, speed loop control, and current loop control, by digital servo processing, based on the move commands distributed to the individual axes (of the injection servomotor M1 and screw-rotation servomotor M2), position and speed feedback signals detected by the position/speed detectors Penc1 and Penc2, etc.

The above-described configuration differs from that of the controller of a conventional electric injection molding machine only in that the controller according to the present invention has a metering control function for the molding machine.

Figure 2:
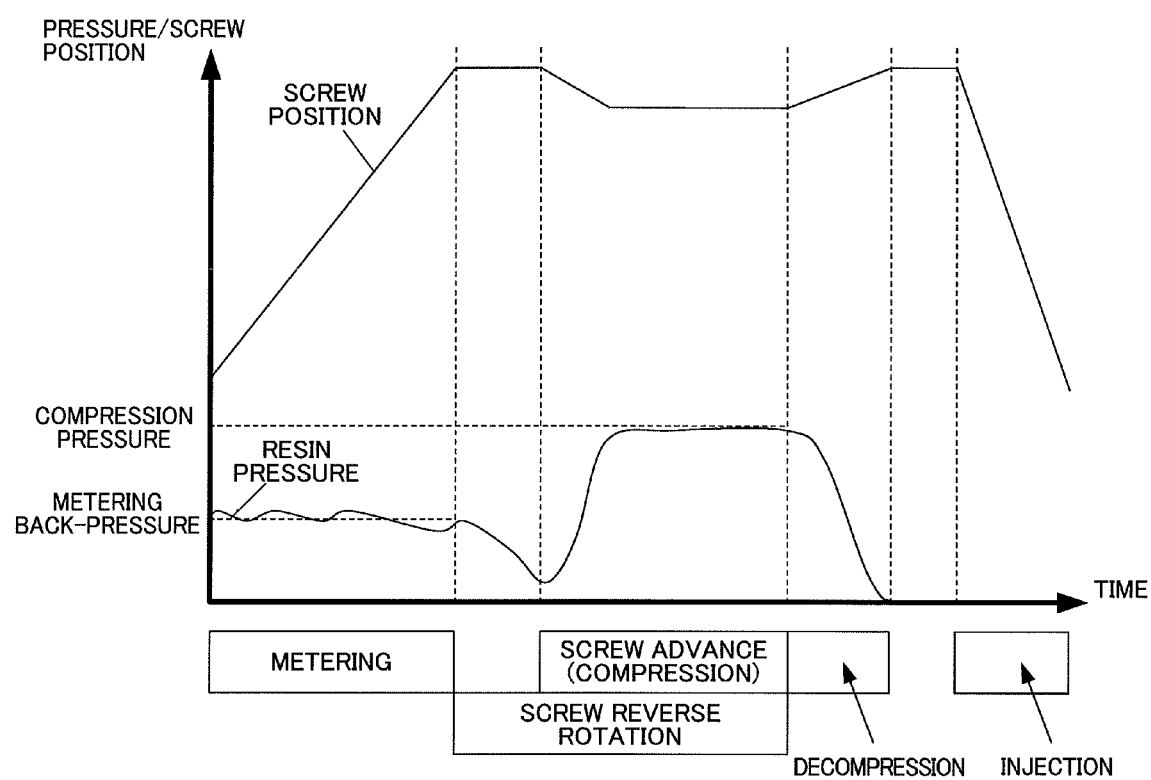
FIG. 2 is a diagram illustrating how a check valve is closed in the metering controller of the invention with a metering control function for the injection molding machine.

As shown in FIG. 2, the metering controller according to the invention is characterized in that reverse rotation of the screw is started after the end of metering, and it is continued as the screw is advanced so that the resin pressure increases to a predetermined pressure, thereby closing a check valve.

In order to close the check valve, a difference greater than a certain value has to be produced between pressures before and behind the check valve. According to the present invention, the screw reverse rotation is previously started before the advance of the screw, and the advance is started with the difference produced between the pressures before and behind the check valve. In this way, a total pressure difference equal to the sum of a "pressure difference $\Delta Pa$ caused by the screw reverse rotation" and a "pressure difference $\Delta Pb$ caused by the screw advance" is produced in the initial stage of the screw advance. Thus, if the resin pressure increased by the screw advance is low, that is, if the pressure difference $\Delta Pb$ caused by the screw advance is small, the pressure difference needed to close the check valve can be produced by the addition of the pressure difference $\Delta Pa$ by the screw reverse rotation. Consequently, the check valve can be closed reliably and steadily. The process of "screw advance (compression)" shown in FIG. 2 is equivalent to a pilot injection unit that constitutes the metering controller according to the present invention.

<Condition for Screw Advance>

The timing for advancing the screw is essential to the present invention. The following is a description of conditions for the start of the screw advance for the case where the screw is advanced according to the invention.

1. The screw may be advanced, for example, after the passage of a predetermined standby time since the start of the screw reverse rotation, as a condition for the start of the screw advance. In this way, the screw advance is withheld before the production of the pressure difference by the screw reverse rotation and is started after the production of the pressure difference by the screw reverse rotation. Thus, a sufficient pressure difference can be produced in the initial stage of the screw advance, so that the check valve can be closed quickly and steadily.

In general, the screw reverse rotation is driven with a predetermined time constant before its speed reaches a set speed, so that the predetermined standby time may be set to a value corresponding to the time constant of the screw reverse rotation. If the predetermined standby time is set to be equal to the time constant of the screw reverse rotation, for example, the screw advance can be started the moment the screw reverse rotation speed reaches the set speed. The standby time may be set on the screen by an operator, according to the resin and molding conditions.

2. The screw advance may be started when a predetermined speed is reached by the screw reverse rotation speed after the start of the screw reverse rotation. In this case, the predetermined speed may be previously set corresponding to the screw diameter or shape, as a speed needed to produce a sufficient pressure difference by the screw reverse rotation. The predetermined speed may be set on the screen by an operator, according to the resin and molding conditions.

Figure 3:
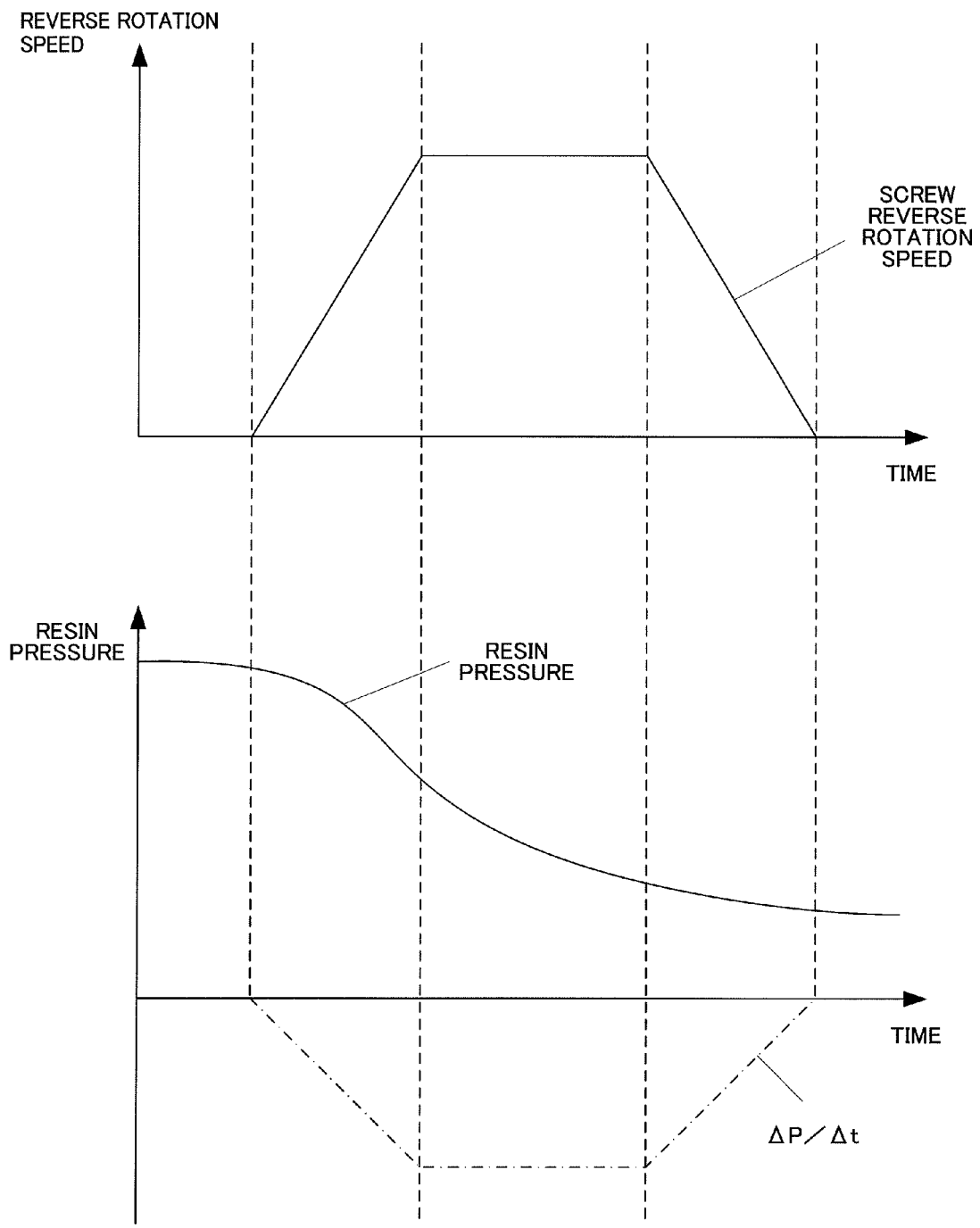
FIG. 3 is a diagram illustrating how screw advance can be started when a predetermined value is reached by a resin pressure variation per unit time in place of a screw reverse rotation speed.
Figure 8:
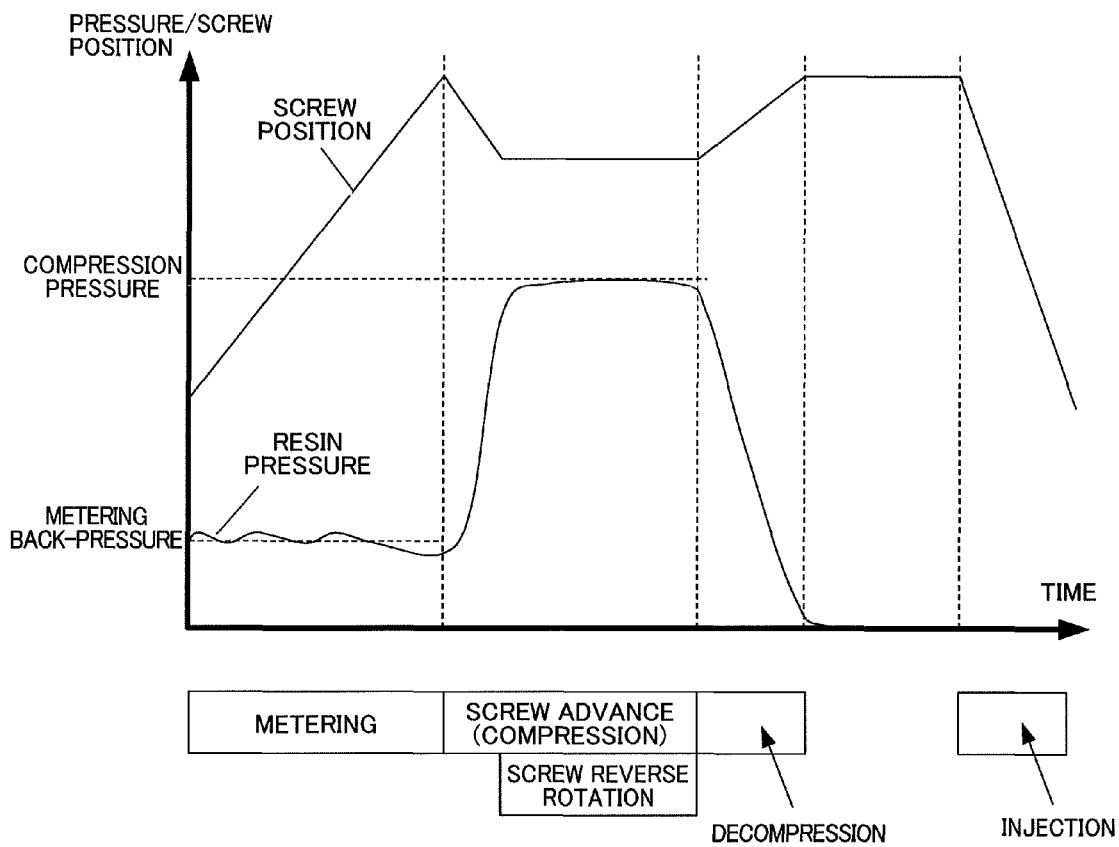
FIG. 8 is a diagram illustrating closing control of a prior art check valve.

3. The screw advance may be started when a predetermined value is reached by a resin pressure variation ($\Delta P/\Delta t$) per unit time in place of the screw reverse rotation speed. Before the start of the reverse rotation after the end of the metering, the resin pressure is almost as high as a metering back-pressure and is reduced, since the molten resin on the tip side of the screw is moved backward relative to the screw by the screw reverse rotation. When this is done, the absolute value ($|\Delta P/\Delta t|$) of the resin pressure variation per unit time is proportional to the reverse rotation speed (FIG. 3). Thus, the screw advance can be started after the predetermined value is reached by the resin pressure variation per unit time in substantially the same condition as where the screw advance is started after the predetermined speed is reached by the screw reverse rotation speed.

4. The screw advance may be started when the resin pressure is reduced to the predetermined pressure after the start of the screw reverse rotation. If the resin pressure that is increased as the screw is advanced is assumed to be a low pressure, the resin pressure before the screw advance process should preferably be reduced as low as possible. If this is done, the screw advance is withheld before the resin pressure is reduced to the predetermined pressure, and is started at the low pressure thereafter. Therefore, the pressure greatly increases immediately after the start of the screw advance, so that the check valve can be closed quickly and steadily. The predetermined pressure may be previously set to a value near zero. The predetermined pressure may be set on the screen by an operator, according to the resin and molding conditions.

<Control of Screw Longitudinal Axis with Screw Advance Withheld>

While the screw advance is being withheld since the start of the screw reverse rotation after the metering, the screw may be controlled so that the position of its longitudinal axis is maintained, retreated, or allowed to freely move in the screw longitudinal direction.

<Termination Time of Screw Reverse Rotation>

The screw reverse rotation is started, the screw advance is then started, and the screw reverse rotation is continued during the screw advance process. Thereafter, the reverse rotation may be finished the moment the screw advance process is finished. Alternatively, the reverse rotation may be finished before or after the end of the screw advance process. Alternatively, moreover, the reverse rotation may be finished when the screw is further reversely rotated through a predetermined reverse rotation angle from the angle of reverse rotation at which the screw advance was started. Alternatively, furthermore, the reverse rotation may be finished when the screw is further reversely rotated through a predetermined reverse rotation angle from the angle of reverse rotation at which the resin pressure was increased to a predetermined value after the start of the screw advance. Alternatively, moreover, the reverse rotation may be finished when the screw is further reversely rotated through a predetermined reverse rotation angle from the angle of reverse rotation at the end of the screw advance.

<Control of Screw Advance>

In advancing the screw so that the resin pressure reaches a predetermined compression pressure, the screw may be advanced under pressure control, or the screw may be advanced under speed control before the resin pressure reaches the predetermined compression pressure.

Processing for advancing the screw according to the above-described condition will now be described with reference to the flowcharts of FIGS. 4 to 7.

FIG. 4 is a flowchart illustrating an algorithm of processing performed by the metering controller of the present invention in which the screw advance is started after the passage of the predetermined time since the start of the screw reverse rotation. The following is a sequential description of various steps of operation.

[Step SA01] An injection/dwell process is performed.
[Step SA02] A metering process is performed.
[Step SA03] The screw reverse rotation is started.
[Step SA04] A timer is started.
[Step SA05] It is determined whether or not the count time of the timer is equal to or greater than a predetermined value. If the count time is equal to or greater than the predetermined value (Determination: YES), the program proceeds to Step SA06. If not (Determination: NO), the program waits until the count time of the timer becomes equal to or greater than the predetermined value, and the program then proceeds to Step SA06.
[Step SA06] The screw advance is started.
[Step SA07] The screw advance and screw reverse rotation are finished.
[Step SA08] A decompression process is performed, whereupon this processing is finished.

FIG. 5 is a flowchart illustrating an algorithm of processing performed by the metering controller of the present invention in which the screw advance is started when the predetermined speed is reached by the screw reverse rotation speed after the start of the screw reverse rotation. The following is a sequential description of various steps of operation.

[Step SB01] An injection/dwell process is performed.
[Step SB02] A metering process is performed.
[Step SB03] The screw reverse rotation is started.
[Step SB04] A timer is started.
[Step SB05] It is determined whether or not the screw reverse rotation speed is equal to or higher than a predetermined value. If the reverse rotation speed is equal to or higher than the predetermined value (Determination: YES), the program proceeds to Step SB06. If not (Determination: NO), the program waits until the reverse rotation speed becomes equal to or higher than the predetermined value, and the program then proceeds to Step SB06.
[Step SB06] The screw advance is started.
[Step SB07] The screw advance and screw reverse rotation are finished.
[Step SB08] A decompression process is performed, whereupon this processing is finished.

FIG. 6 is a flowchart illustrating an algorithm of processing performed by the metering controller of the present invention in which the screw advance is started when the predetermined value is reached by the resin pressure variation per unit time after the start of the screw reverse rotation. The following is a sequential description of various steps of operation.

[Step SC01] An injection/dwell process is performed.
[Step SC02] A metering process is performed.
[Step SC03] The screw reverse rotation is started.
[Step SC04] A timer is started.
[Step SC05] It is determined whether or not the resin pressure variation ($\Delta P/\Delta t$) per unit time is smaller than a predetermined value. If the variation is smaller than the predetermined value (Determination: YES), the program proceeds to Step SC06. If not (Determination: NO), the program waits until $\Delta P/\Delta t$ becomes smaller than the predetermined value, and the program then proceeds to Step SC06.
[Step SC06] The screw advance is started.
[Step SC07] The screw advance and screw reverse rotation are finished.
[Step SC08] A decompression process is performed, whereupon this processing is finished.

FIG. 7 is a flowchart illustrating an algorithm of processing performed by the metering controller of the present invention in which the screw advance is started when the resin pressure is reduced to the predetermined pressure after the start of the screw reverse rotation. The following is a sequential description of various steps of operation.

[Step SD01] An injection/dwell process is performed.
[Step SD02] A metering process is performed.
[Step SD03] The screw reverse rotation is started.
[Step SD04] A timer is started.
[Step SD05] It is determined whether or not the resin pressure is lower than a predetermined value. If the resin pressure is lower than the predetermined value (Determination: YES), the program proceeds to Step SD06. If not (Determination: NO), the program waits until the resin pressure becomes lower than the predetermined value, and the program then proceeds to Step SD06.
[Step SD06] The screw advance is started.
[Step SD07] The screw advance and screw reverse rotation are finished.
[Step SD08] A decompression process is performed, whereupon this processing is finished.

The invention claimed is:

1. A metering controller for an injection molding machine, comprising:
    a screw advancing/retreating unit for advancing and retreating a screw;
    a screw rotating unit for rotating the screw;
    a resin pressure detection unit configured to detect a resin pressure;
    a metering unit configured to retreat the screw to a preset metering completion position while forwardly rotating the screw during metering;
    a screw reverse rotation unit configured to reversely rotate the screw during a time period between the end of the metering and the start of injection; and
    a pilot injection unit configured to advance the screw so that the resin pressure reaches a predetermined compression pressure during the time period between the end of the metering and the start of the injection,
    wherein the pilot injection unit is configured to start screw advance, while reverse rotation of the screw is continued, after the start of the screw reverse rotation by the screw reverse rotation unit, and
    the screw reverse rotation unit is configured to finish the screw reverse rotation after the start of the screw advance by the pilot injection unit.

2. The metering controller for an injection molding machine according to claim 1, wherein the screw reverse rotation unit starts the reverse rotation while the advance and retreat of the screw are stopped.

3. The metering controller for an injection molding machine according to claim 1, wherein the pilot injection unit maintains the position of the screw while the screw advance is being withheld since the start of the screw reverse rotation.

4. The metering controller for an injection molding machine according to claim 1, wherein the pilot injection unit starts the screw advance after the elapse of a predetermined time since the start of the screw reverse rotation by the screw reverse rotation unit.

5. The metering controller for an injection molding machine according to claim 1, wherein the pilot injection unit starts the screw advance when a predetermined speed is reached by the speed of the screw reverse rotation after the start of the screw reverse rotation by the screw reverse rotation unit.

6. The metering controller for an injection molding machine according to claim 1, wherein the pilot injection unit starts the screw advance when a predetermined value is reached by a resin pressure variation per unit time after the start of the screw reverse rotation by the screw reverse rotation unit.

7. The metering controller for an injection molding machine according to claim 1, wherein the pilot injection unit starts the screw advance when the resin pressure is reduced to a predetermined pressure after the start of the screw reverse rotation by the screw reverse rotation unit.

\* \* \* \* \*